(12) United States Patent
Kim et al.

(10) Patent No.: US 7,359,722 B2
(45) Date of Patent: Apr. 15, 2008

(54) APPARATUS AND METHOD FOR DELETING A TEXT MESSAGE RECEIVED IN A MOBILE COMMUNICATION TERMINAL

(75) Inventors: Seon-Mi Kim, Suwon-si (KR); Hyun-Ry Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 490 days.

(21) Appl. No.: 10/967,974

(22) Filed: Oct. 18, 2004

(65) Prior Publication Data

US 2005/0108621 A1    May 19, 2005

(30) Foreign Application Priority Data

Nov. 19, 2003   (KR) .................. 10-2003-0082130

(51) Int. Cl.
  *H04Q 7/20* (2006.01)
(52) U.S. Cl. ............... 455/466; 455/412.1; 455/412.2; 455/413; 455/415; 709/206; 709/207; 379/142.15; 379/67.1
(58) Field of Classification Search ............. 455/466, 455/419, 442; 209/206, 202; 215/500; 315/233; 329/142.15, 62.1
  See application file for complete search history.

(56) References Cited

U.S. PATENT DOCUMENTS

| | | | |
|---|---|---|---|
| 5,856,787 A * | 1/1999 | Ikka | 340/7.41 |
| 6,088,720 A * | 7/2000 | Berkowitz et al. | 709/206 |
| 6,115,455 A * | 9/2000 | Picard | 379/67.1 |
| 6,212,265 B1 * | 4/2001 | Duphorne | 379/142.15 |
| 6,324,569 B1 * | 11/2001 | Ogilvie et al. | 709/206 |
| 6,393,465 B2 * | 5/2002 | Leeds | 709/207 |
| 6,487,586 B2 * | 11/2002 | Ogilvie et al. | 709/206 |
| 2001/0012347 A1 * | 8/2001 | Fujino et al. | 379/142.06 |
| 2002/0025802 A1 * | 2/2002 | Dupuis | 455/419 |
| 2002/0026487 A1 * | 2/2002 | Ogilvie et al. | 709/206 |
| 2003/0142125 A1 * | 7/2003 | Salmimaa et al. | 345/733 |

FOREIGN PATENT DOCUMENTS

| | | | |
|---|---|---|---|
| JP | 10051545 A | * | 2/1998 |
| JP | 11-122647 | | 4/1999 |

* cited by examiner

*Primary Examiner*—David Q. Nguyen
(74) *Attorney, Agent, or Firm*—The Farrell Law Firm, PC

(57) ABSTRACT

Disclosed is an apparatus for deleting a text message received in a mobile communication terminal including an information detecting unit for detecting deletion time information from the received text message; a time checking unit for checking whether the deletion time arrives; and a deleting unit for deleting the received text message at the deletion time. The deletion time information is generated when the text message is generated by a calling side mobile communication terminal, is transmitted, and then is inserted as a predetermined tag into a CHARi field of a user data subparameter, from among subparameters of the bearer data parameter of the transport layer in the short message service data burst message structure. Otherwise, the deletion time information is included in a validity period subparameter, or is detected in a newly added subparameter. The apparatus may allow a selected message to be automatically deleted, thereby preventing a situation in which other messages are not received due to memory usage by spam message.

2 Claims, 5 Drawing Sheets

APPARATUS AND METHOD FOR DELETING A TEXT MESSAGE RECEIVED IN A MOBILE COMMUNICATION TERMINAL

PRIORITY

This application claims priority to an application entitled "Apparatus and Method for Deleting Text Message Received in Mobile Communication Terminal" filed in the Korean Intellectual Property Office on Nov. 19, 2003 and assigned Ser. No. 2003-82130, the contents of which are hereby incorporated by reference.

BACKGROUND OF THE INVENTION

1. Field of the Invention

The present invention relates to an apparatus and a method for deleting a text message received in a mobile communication terminal.

2. Description of the Related Art

Typically, a text message is deleted in the following cases in the course to being transmitted.

First, a user directly deletes the text message received in a mobile communication terminal.

Second, when a new text message is received and a user mobile communication terminal's memory fills with text messages, a base station deletes an old text message, which has been previously read and stored, and receives a new one. However, this is limited to a situation in which the new text message is a message in which a corresponding field of a bearer reply option subparameter from among subparameters defined by an IS-637 Standard document is received without having been set.

Third, when a text message, which has been stored only in a short message service center (hereinafter, referred to as an SMSC) and has not been transmitted to the user mobile communication terminal, is not transmitted within a time supplied by a validity period subparameter from among the subparameters defined by the IS-637 Standard document, that is, when a reserved transmission has failed, the SMSC automatically deletes the message.

Considering the situations in which the text message is deleted as described above, the user experiences the following inconveniences and difficulties.

First, when it is assumed that the user mobile communication terminal is registered to a server supporting a text message in which the corresponding field of the bearer reply option subparameter has been set and received, in a case in which a user who does not normally use his/her own mobile communication terminal leaves a memory filled with text messages as it is, newly transmitted text messages are not received in the mobile communication terminal until the user deletes the previously stored messages.

Second, current technology may not block all spam text messages. Accordingly, memory may be wasted when unwanted messages are received and stored. In addition, because of the memory use by unsolicited messages it may be impossible to receive wanted or important text messages.

SUMMARY OF THE INVENTION

Accordingly, the present invention has been made to solve the above-mentioned problems occurring in the prior art. It is a first object of the present invention to provide an apparatus and a method for deleting a text message received in a mobile communication terminal, which allows a calling side sending the text message to set a time at which a corresponding text message is to be deleted and transmit the set time.

A second object of the present invention is to provide an apparatus and a method for deleting a text message received in a mobile communication terminal, which allows a text message received from a number not registered in an address book of the mobile communications terminal to be automatically deleted after a predetermined time.

In order to accomplish the aforementioned objects, according to one aspect of the present, there is provided an apparatus for deleting a text message received in a mobile communication terminal including an information detecting unit for detecting deletion time information from the received text message; a time checking unit for checking whether the deletion time arrives; and a deleting unit for deleting the received text message at deletion time.

In order to accomplish the aforementioned objects, according to one aspect of the present invention, there is provided an apparatus for deleting a text message received in a mobile communication terminal including an information detecting unit for detecting a caller number from the received text message; a memory unit including a first memory for storing an address book at which a text message caller number is registered, and a second memory for storing a deletion time; a searching unit for searching whether a number which is the same as the detected caller number exists in the address book; a time checking unit for checking whether the deletion time stored in the second memory arrives when the same caller number is not found by the searching unit; and a deleting unit for deleting the received text message at the deletion time.

In order to accomplish the aforementioned objects, according to one aspect of the present, there is provided a method for deleting a text message received in a mobile communication terminal including the steps of detecting deletion time information from the received text message; checking whether the deletion time arrives according to the deletion time information; and deleting the received text message when the deletion time arrives.

In order to accomplish the aforementioned objects, according to one aspect of the present, there is provided a method for deleting a text message received in a mobile communication terminal including an address book at which a text message caller number is registered and a memory unit for storing a deletion time including the steps of detecting a caller number from the received text message; searching whether the detected caller number is a number registered in the address book; checking whether the deletion time set in advance arrives when the detected caller number is not a number registered in the address book; and deleting the received text message when it is judged that the deletion time arrives.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
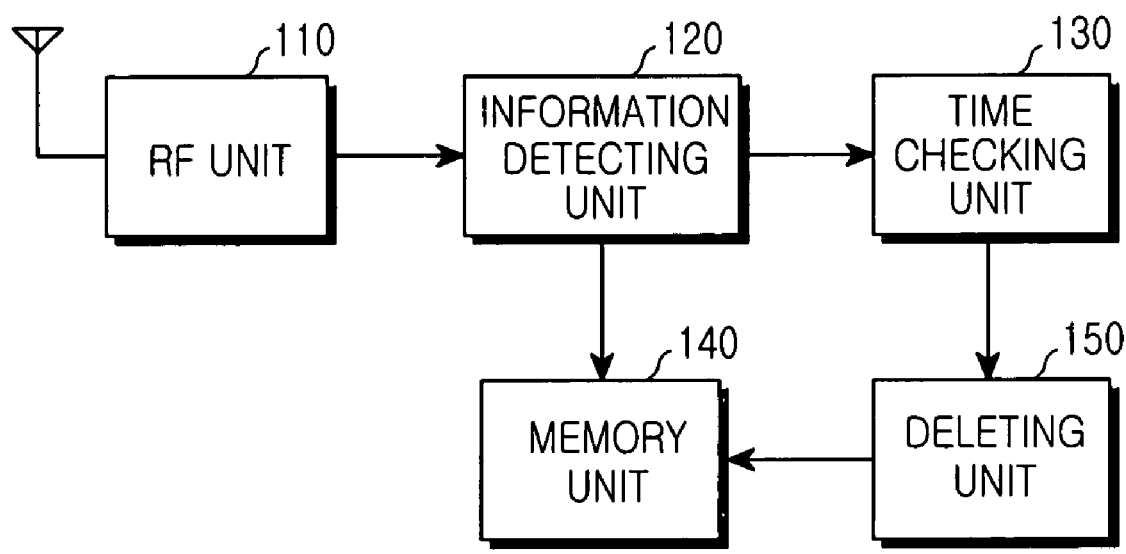
FIG. 1 is a block diagram showing a construction of an apparatus, which deletes a text message received in a mobile communication terminal according to a preferred embodiment of the present invention.

Hereinafter, a preferred embodiment according to the present invention will be described with reference to the accompanying drawings. The same reference numerals are used to designate the same elements as those shown in other drawings. In the following description, many particular items, such as detailed elements of circuits, are shown, but these are provided for helping the general understanding of the present invention, it will be understood by those skilled in the art that the present invention can be embodied without particular items. In the following description of the present invention, a detailed description of known functions and configuration incorporated herein will be omitted when it may make the subject matter of the present invention unclear.

In order to transmit a sentence created by a caller, the caller's mobile communication terminal must include a menu for selecting an "automatic deletion time" from among sentence editing menus displayed in the caller's mobile communication terminal. The caller selects a time, at which a corresponding message must be deleted after being received in a counterpart mobile communication terminal, in the form of year/month/day/hour/minute/second. The selection may be set in various ways, such as several hours or several days after being received, according to a menu construction.

If the mobile communication terminal belongs to an SMSC supporting a validity period subparameter from among subparameters defined by an IS-637 Standard document, there exists a limitation in that the automatic deletion time is set to be shorter than a validity period when a user sets the automatic deletion time in a selection menu. That is, the validity period is limited by the maximum range of the automatic deletion time. An automatic deletion time selected in this manner may be added to a CHARi field of a user data subparameter as a predetermined tag. Herein, since the SMSC has a function of automatically deleting a text message from a memory of the SMSC, which has not been transmitted to the user's mobile communication terminal within a time supplied by a validity period subparameter, the limitation as described above can prevent a case from occurring in which the mobile communication terminal may delete data having been already deleted by the SMSC when the mobile communication terminal also has a deletion function.

FIG. 1 is a block diagram showing a construction of an apparatus, which deletes a text message received in a mobile communication terminal according to a preferred embodiment of the present invention. A wireless unit 110 receives a text message from a base station (not shown) through an antenna, a memory unit 140 includes a memory for storing the received text message. The memory may include an electrically erasable programmable read-only memory (hereinafter, referred to as an EEPROM). An information detecting unit 120 detects deletion time information in the received text message and a time checking unit 130 checks whether the deletion time arrives. The check regarding whether the deletion time arrives may be performed by means of time of a corresponding receiver mobile communication terminal. A deleting unit 150 deletes the text message stored in the memory unit 140 when the deletion time arrives. The deletion time information is generated when the text message is generated by a calling side mobile communication terminal and is transmitted.

Figure 2:
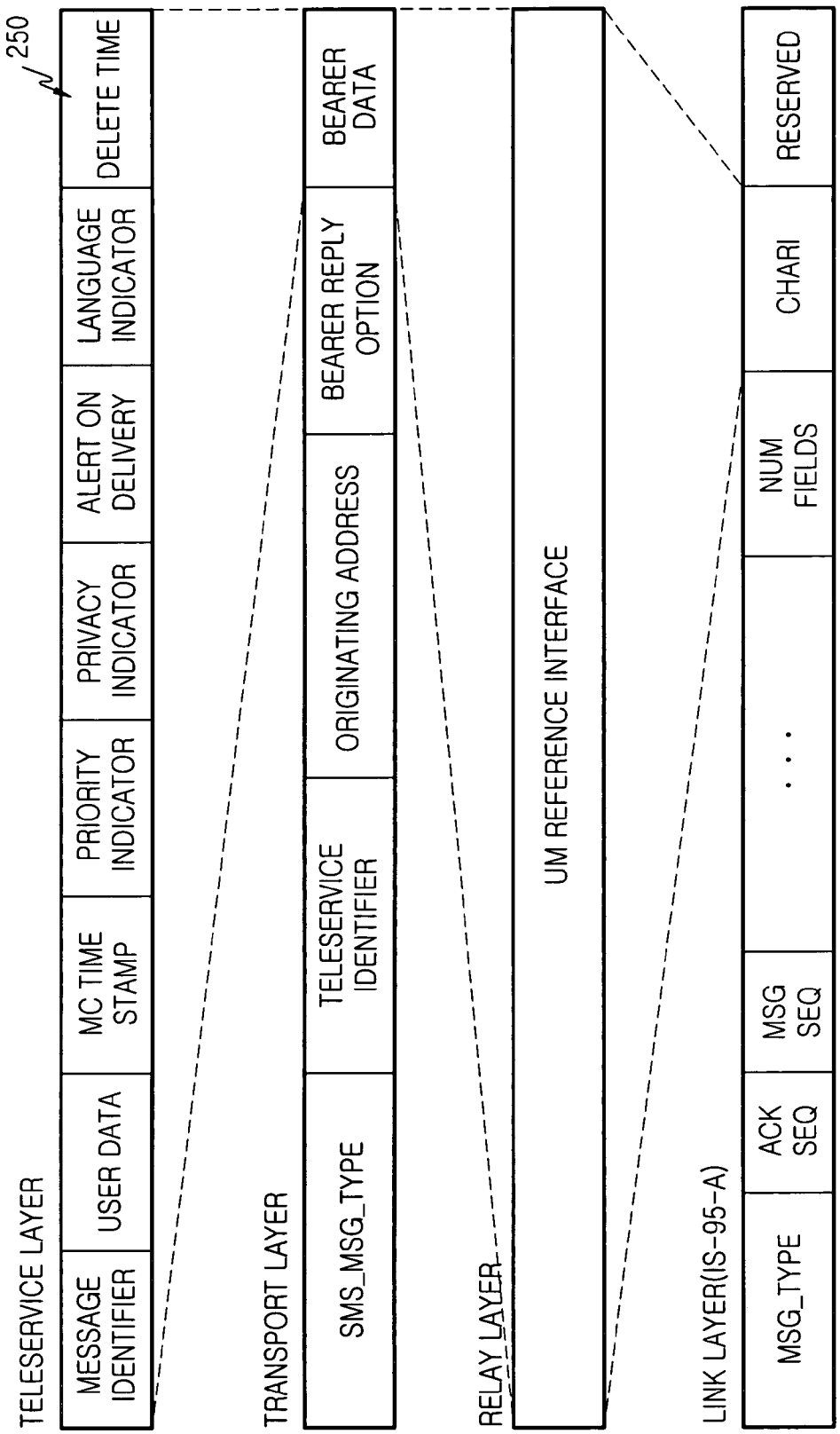
FIG. 2 is a block diagram of a structure of a short message service data burst message according to a preferred embodiment of the present invention.

FIG. 2 is a block diagram of a structure of a short message service data burst message according to a preferred embodiment of the present invention. FIG. 2 shows a structure of each layer message of an IS-637 Standard. Herein, the fact that a subparameter such as a reference numeral 250 added newly to the existing teleservice layer exists is different from the existing IS-637 Standard.

That is, the new subparameter 250 is a subparameter for storing time at which a text message sent from a transmission-side will be deleted in a receiver mobile communication terminal. When the new subparameter 250 is added to the teleservice layer, the maximum size of user data is not limited in comparison with a situation in which a user data subparameter is used, which will be described later. This new subparameter 250 has a similar structure as that of a validity period subparameter, which will be described later. If the deletion time is selected as a certain number of days afterwards, the mobile communication terminal automatically calculates in the form of year/month/day/hour/minute/second and fills each field (year/month/day/hour/minute/second fields).

Instead of adding a new subparameter to the teleservice layer in this way, the other existing subparameter may be modified. That is, a predetermined tag is provided in a CHARi field of a user data subparameter (e.g., section 4.5.2 of the TIA/EIA/IS-637-A Standard) from among subparameters of a bearer data parameter in a transport layer and the tag is transmitted together with the deletion time. For instance, a header is added to the CHARi field, the deletion time is inserted into the header, and the header is transmitted.

Further, the validity period subparameter (e.g., section 4.5.5 validity period-absolute or section 4.5.6 validity period-relative to the TIA/EIA/IS-637-A Standard) may be sent to a receiving mobile communication terminal (currently, the validity period subparameter is sent to an SMSC). Then, the mobile communication terminal receives the validity period subparameter to detect deletion time information, and may delete a corresponding text message when the deletion time arrives.

Figure 3:
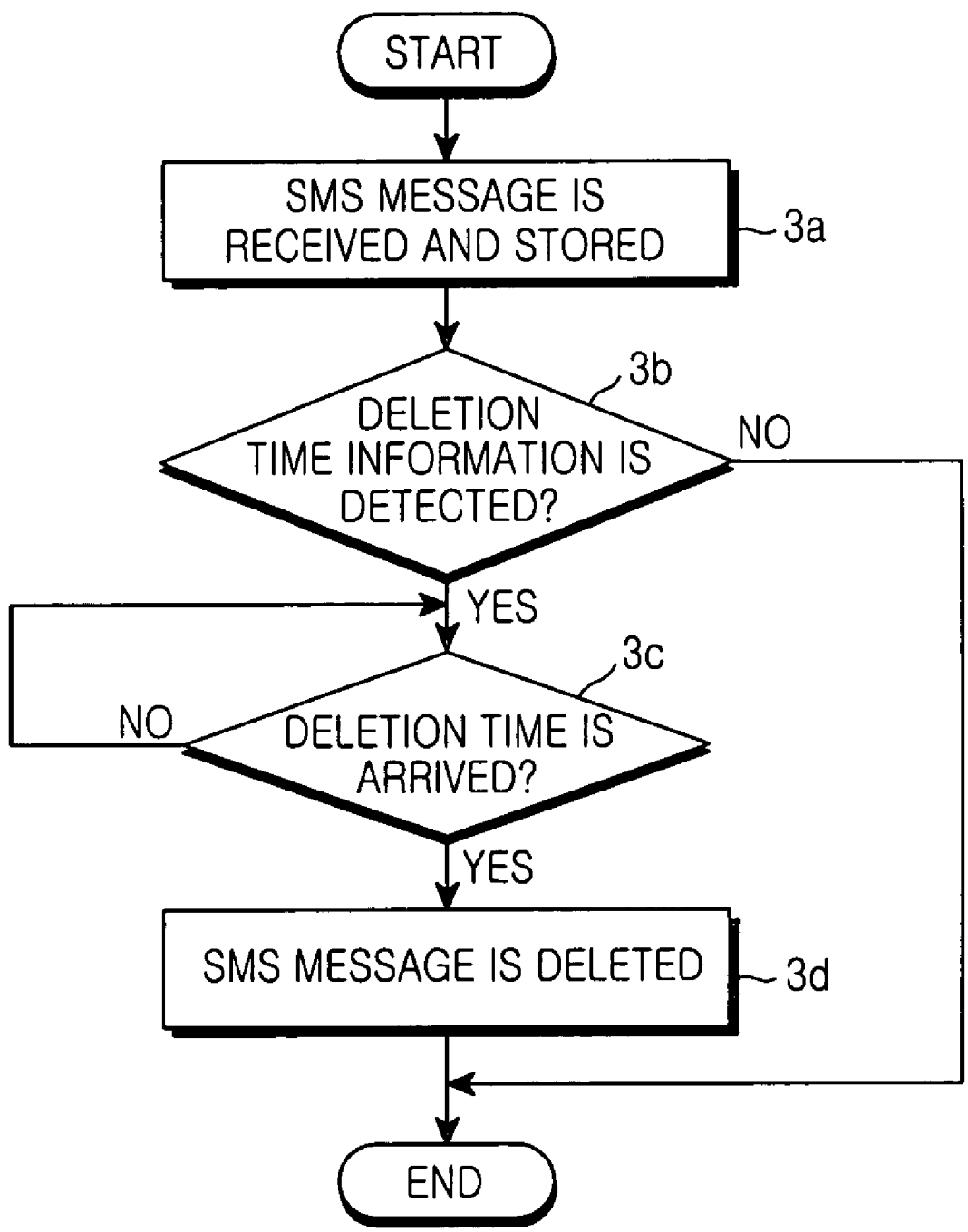
FIG. 3 is a flowchart illustrating a method of deleting a text message received in a mobile communication terminal according to a preferred embodiment of the present invention.

FIG. 3 is a flowchart illustrating a method of deleting a text message received in a mobile communication terminal according to a preferred embodiment of the present invention. In step 3a, the mobile communications terminal checks whether a text message is received. From the result of the check of when the text message is received, the deletion time information is detected from the text message in step 3b. Then, in step 3c, it is checked whether a deletion time arrives according to the deletion time information. That is, whether the deletion time arrives, is detected through an operation start of a corresponding time checking unit or other manner. Further, when it is judged that the deletion time has arrived, the received text message stored in a memory unit is deleted in step 3d.

Hereinafter, a more detailed description will be given with reference to a detailed example.

It is assumed that a caller sends a sentence such as "//ADT030821131430//eHi?this is just a test". Herein, "//ADT" represents a start of an automatic deletion time, and "030821131430" is 1:14:30 P.M, Aug. 21, 2003 and represents a time at which this message will be deleted. Further, "//e" represents an end of the deletion time. The part "//e" intact may be displayed, or the part "Hi?this is just a test" excepting for the part "//e" may be displayed as general text message contents and the contents of the part "//e" may be displayed through a separate pop-up window, or the contents of the part "//e" is filled into a predetermined field and may be displayed. Therefore, the contents of the part "//e" may be reported to a receiver.

Meanwhile, the automatic deletion time may be disabled by the selection of a receiving side mobile communication terminal user. Further, all messages except for a message, which is sent to a person registered in an address book of the receiving side mobile communication terminal, are automatically deleted after a time selected by the user, so that spam mail may be automatically deleted. Also, only predetermined messages may be automatically deleted. In contrast, even if there is an automatic deletion tag, some messages may be kept.

Figure 4:
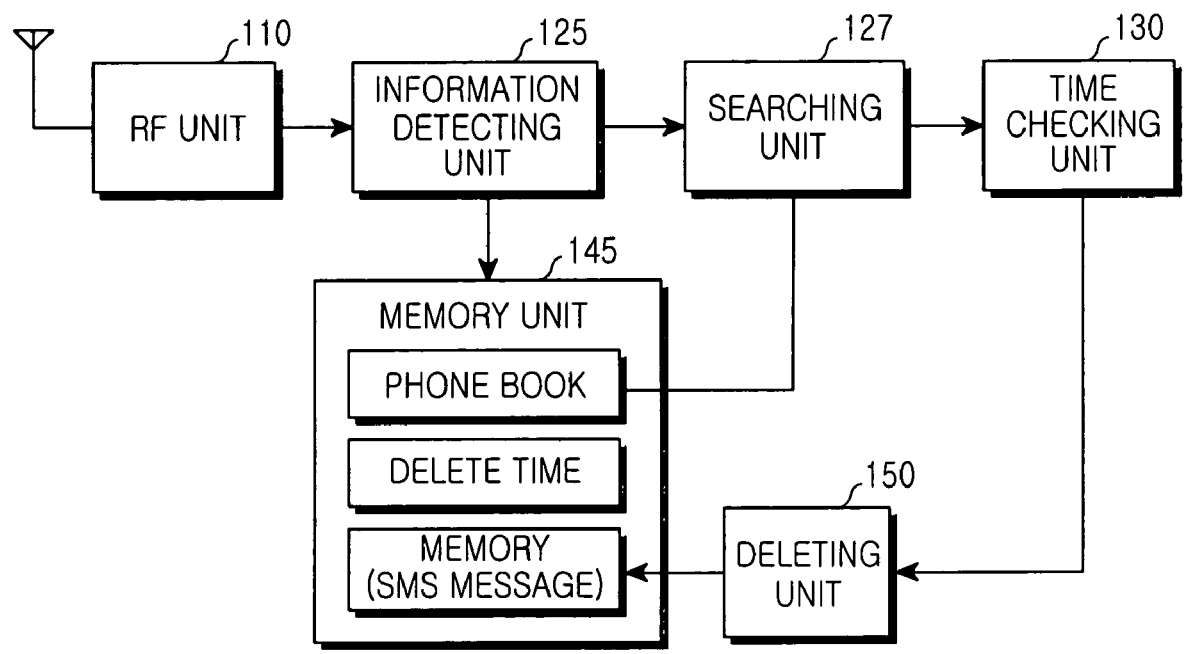
FIG. 4 is a block diagram showing a construction of another apparatus which deletes a text message received in a mobile communication terminal according to a preferred embodiment of the present invention.

FIG. 4 is a block diagram showing a construction of another apparatus, which deletes a text message received in a mobile communication terminal according to a preferred embodiment of the present invention. A wireless unit 110 receives a text message from a base station (not shown) through an antenna, a memory unit 145 includes a first memory for storing an address book at which a text message caller number is registered, a second memory for storing a deletion time, and a third memory for storing a received text message. The second memory and the third memory may include an EEPROM, and an information deleting unit 125 detects the caller number from the received text message. A searching unit 127 searches whether a number, which is the same as the detected caller number exists in the address book. A time checking unit 130 checks whether the deletion time stored in the second memory arrives when the same caller number is not found by the searching unit 127, and a deleting unit 150 deletes the received text message when the deletion time arrives.

Figure 5:
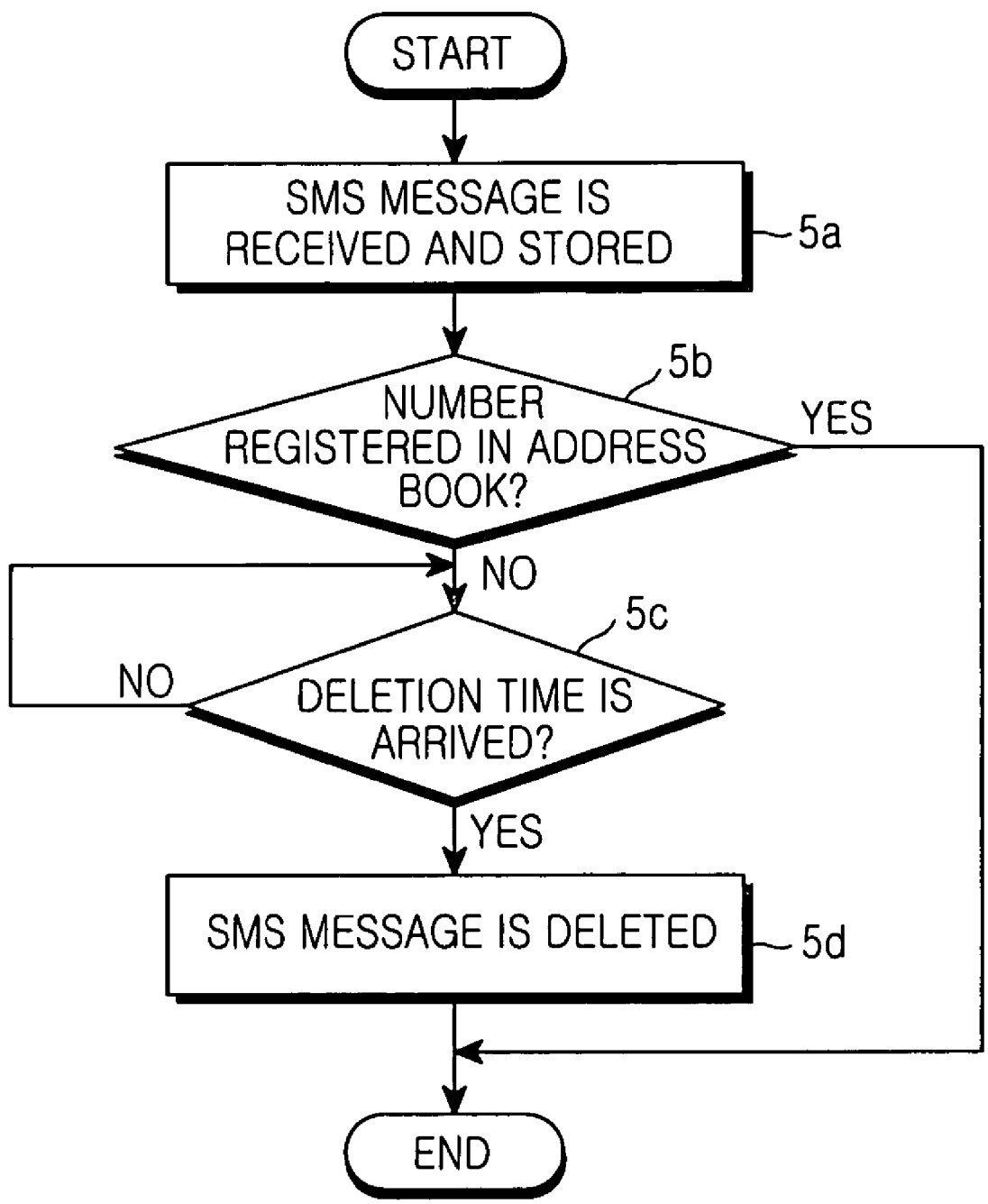
FIG. 5 is a flowchart illustrating another method of deleting a text message received in a mobile communication terminal according to a preferred embodiment of the present invention.

FIG. 5 is a flowchart illustrating another method of deleting a text message received in a mobile communication terminal according to a preferred embodiment of the present invention. When a text message is received in step 5*a*, the received text message is stored in the memory unit 145. In step 5*b*, a caller number is detected from the received text message and whether the detected caller number is a number registered in the address book is checked. When the detected caller number is not a number registered in the address book, in step 5*c* it is checked whether the deletion time set in advance arrives. Then, when it is judged that the deletion time has arrived, the received text message stored in the memory unit 145 is deleted in step 5*d*. For this purpose, a mobile communication terminal (receiving side) user must set a corresponding deletion time in advance. For instance, when a text message is received from a telephone number, which does not exist in the address book, the text message may be automatically deleted after one day.

As described above, the present invention may allow a selected message to be automatically deleted, thereby preventing a situation in which wanted messages are not received due to unsolicited spam messages. Especially, in a case of a message from among the spam messages which reports that an event is being held up to some date, since there is no need to keep the message after the date, an advertiser-side may send a time at which the message is to be deleted in advance, so that users receiving the message have less antipathy for the message. Further, a caller may select a time at which the message is to be deleted and may send such time to a user who does not manage the message box well, so that the waste of memory may be minimized.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for deleting a text message received in a mobile communication terminal, the apparatus comprising:
   an information detecting unit for detecting a caller number from the received text message;
   a memory unit including a first memory for storing an address book at which a text message caller number is registered, and a second memory for storing a deletion time;
   a searching unit for searching whether a number, which is the same as the detected caller number exists in the address book;
   a time checking unit for checking whether the deletion time stored in the second memory has arrived when the same caller number is not found by the searching unit; and
   a deleting unit for deleting the received text message at the deletion time.

2. A method for deleting a text message received in a mobile communication terminal including a memory unit for storing an address book at which a text message caller number is registered and a deletion time, the method comprising the steps of:
   detecting a caller number in the received text message;
   searching whether the detected caller number is a number registered in the address book;
   checking whether the deletion time set in advance arrives when the detected caller number is not a number registered in the address book; and deleting the received text message when it is determined that the deletion time has arrived.

* * * * *